United States Patent [19]
Fischer

[11] 3,981,637
[45] Sept. 21, 1976

[54] VARIABLE DISPLACEMENT ROTARY MACHINE WITH OSCILLATING PISTON SLIDES

[76] Inventor: Arno Fischer, Pfistermuhle, 8121 Rottenbuch, Upper Bavaria, Germany

[22] Filed: Nov. 11, 1974

[21] Appl. No.: 522,447

Related U.S. Application Data

[63] Continuation-in-part of Ser. No. 315,337, Dec. 15, 1972, abandoned.

[30] Foreign Application Priority Data

Dec. 21, 1971 Germany............................ 2163423

[52] U.S. Cl..................................... 418/22; 418/28; 418/31; 418/72; 418/176; 418/215; 418/267
[51] Int. Cl.²...................... F01C 1/00; F01C 21/16; F03C 3/00; F04C 1/00
[58] Field of Search............. 418/31, 176, 267, 268, 418/22, 28, 71, 72, 215, 218, 233

[56] References Cited
UNITED STATES PATENTS

| | | | |
|---|---|---|---|
| 758,122 | 4/1904 | Waters | 418/268 |
| 1,616,487 | 2/1927 | Gilman | 418/176 |
| 1,736,666 | 11/1929 | Parks | 418/268 |
| 2,016,315 | 10/1935 | Calzoni | 418/31 |
| 2,980,029 | 4/1961 | Moulton et al. | 418/267 |
| 3,444,820 | 5/1969 | Yamane | 418/267 |
| 3,650,642 | 3/1972 | Cygnor et al. | 418/31 |

FOREIGN PATENTS OR APPLICATIONS

| | | | |
|---|---|---|---|
| 855,741 | 2/1940 | France | 418/31 |
| 392,328 | 11/1921 | Germany | 418/268 |

*Primary Examiner*—John J. Vrablik
*Attorney, Agent, or Firm*—Silverman & Cass, Ltd.

[57] ABSTRACT

A rotary piston engine comprising a stator and a rotor including piston slides in the rotor, and working chambers between the rotor and the stator wherein movable parts are provided in the stator for adjusting the volume of the working chambers.

18 Claims, 20 Drawing Figures

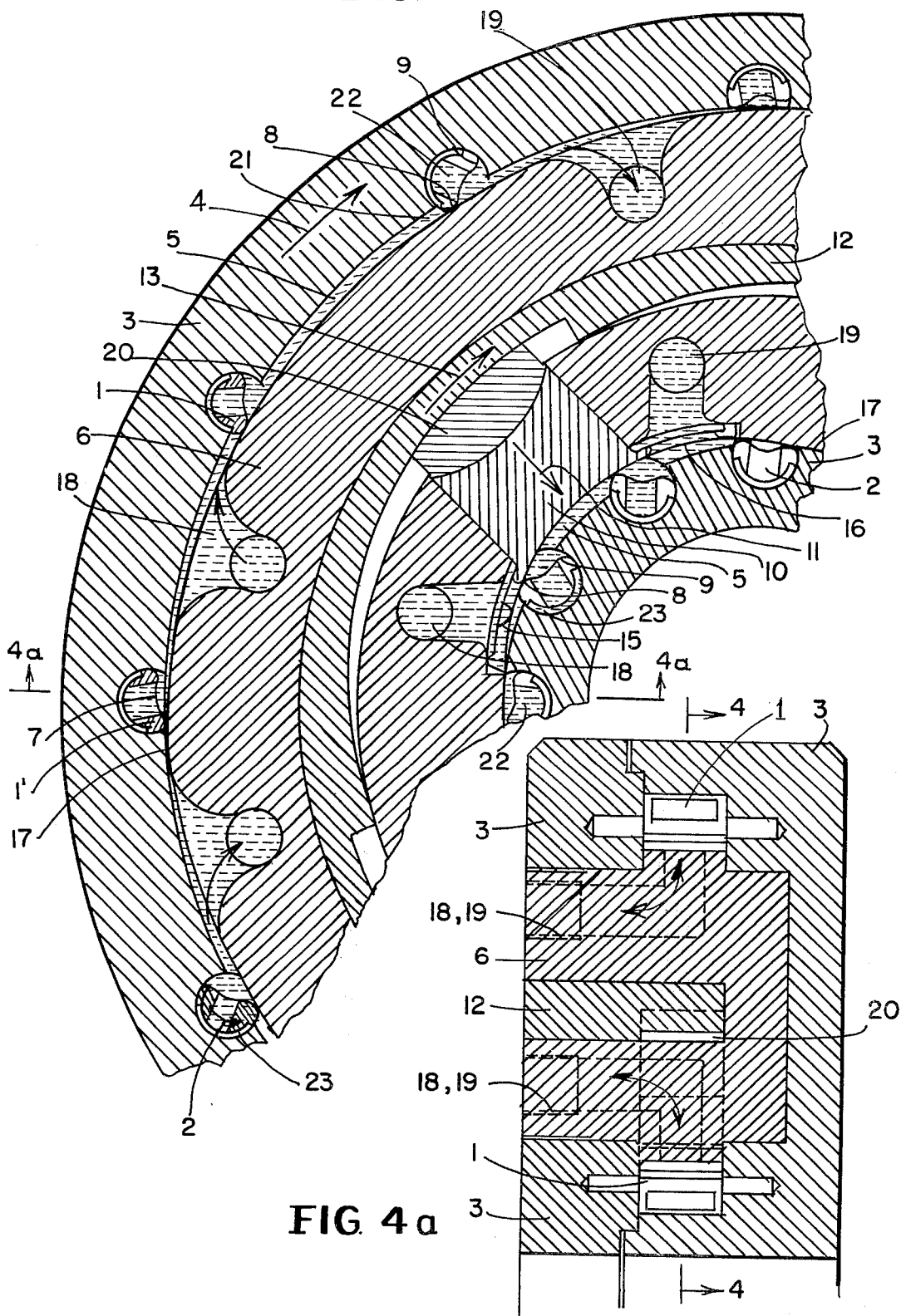

VARIABLE DISPLACEMENT ROTARY MACHINE WITH OSCILLATING PISTON SLIDES

This is a continuation-in-part application of application Ser. No. 315,337, filed Dec. 15, 1972 now abandoned.

BACKGROUND OF THE INVENTION

The invention relates to a rotary piston engine comprising a stator provided with working chambers with feed and discharge ports between partitions, and at least one piston rotating as a rotor, comprising a piston hub and piston slides positioned and distributed circumferentially therein.

DESCRIPTION OF THE PRIOR ART

A number of rotary piston engines are known in the prior art. Most of them operate at medium or low pressures and low numbers of revolutions. However, as soon as the pressures and the rpm are increased, problems arise which render the operation uneconomical.

Furthermore, a combustion engine with rotary pistons is known which is provided with spark plugs. The stator comprises piston slides, while the rotor includes the partitions or separating parts and working chambers. Two working chambers opposite each other respectively are identical. This rotary piston engine of the prior art is so designed that it only operates as a combustion engine.

SUMMARY OF THE INVENTION

The present invention provides for simplifying the structure of a hydraulically operable rotary piston engine of the type noted earlier and expanding the area of application by variation of the volume delivered.

According to the invention, this object is achieved by providing that piston slides positioned in a rotating piston hub are rotation members of cylindrical shape, each comprising a notch as a running surface which upon rotation of the rotor in relation to the stator turn at least partly about their longitudinal axes, and that the running surfaces for the rotary piston slides on the separating parts and in the working chambers are constantly interconnected in the form of curved tracks including feed and discharge ports, wherein the volume of the working chambers is variable. This results in a very simple structure of the rotary piston engine, since the oscillating movement of the piston slides are avoided. Moreover, the direction of rotation of the rotor may be changed, such that the rotary piston engine can operate both as a pump and as a hydraulic motor. By varying the volume of the working chamber the volume of delivery of the rotary piston engine according to the invention can be changed very simply and advantageously. This expands the area of application considerably.

The invention further includes features as follows: The rotating piston hub may be arranged externally, with the working chambers being placed at the outer circumference of the stator. As a result, the axial center of the engine is maintained free, for advantageously placing or guiding therethrough shafts, conduits or the like.

The rotating piston hub may be placed on the inside and the working chamber is arranged at the inner periphery of the externally placed stator designed as a ring.

The inner and outer circumferences of the stator may have working chambers with piston hubs placed on the inside and outside and comprising piston slides arranged therein, being associated with said chambers.

At least one lateral surface of the stator may have the working chambers. The stator may comprise at least one rotating recess which accommodates the working chambers at the lateral walls.

The stator of the rotary piston engine has a profile-like design, wherein the profile surfaces include the working chambers. For example, a T-profile or an angle profile may be used as a profile.

The surface having the working chambers within the stator may at the same time form the running surface for the piston slides. This advantageously results in a particularly simple design.

The working surface of each piston slide comprises a notch extending in axial direction of the piston slide, with its depth corresponding to the height and its length corresponding to the width of the working chamber. The result is a very simple design of the piston slides, so that potential sources of errors during the operation of the rotary piston engine are avoided.

The notches of the piston slides are provided with a rounding at the intersecting line of the circumference of the piston slide. This rounding advantageously results at the operating surface of the piston in an unequal-sided triangle so that, in coaction with the medium, an automatic sealing of the piston slides is achieved in relation to the running surface, because the pressure medium presses via a lever arm the piston slide against the race.

Each piston slide may be pressed with a notch rounding against the direction of rotation of the rotor against the operating chamber race. As already indicated, a satisfactory sealing results thereby between the piston slide and the working chamber race, without the need for additional members.

The direction of rotation of the rotor is reversible. As a result, the rotary piston engine can be operated advantageously as motor, and merely by reversing the direction, the machine may operate as a pump.

The races of the separating part, and the working chambers are constantly interconnected in the form of feed and discharge tracks. As a result of this permanent connection, a perfect guidance of the piston slides without any undesirable additional movement is obtained.

The feed and discharge apertures for the conveying medium are arranged in the separating parts of the stator in the area of the feed and discharge tracks, i.e., close to the ends thereof. As the piston slide scans the apertures, the conveying medium will enter the working chambers, the openings advantageously being so arranged that only a slight structural expenditure is required.

The tracks are of ball-shaped design and perforated diagonally or crosswise; as a result, with the scanning of the piston slide a uniform wear of the piston edges is accomplished.

Each piston slide comprises on the side opposite the notch at least one recess connected with the notch. The recess being connected by perforations with the working chamber, a pressure equilibrium is accomplished advantageously, while friction is kept very low, as the piston slide is located in the bearing only over a small portion of its surface of rotation.

The volume of the operating chamber is variable. This characteristic is very important, since a variable delivery volume is obtainable thereby.

The races of the operating chambers are displaceable. Such shifting may take place equidistantly to the opposite working chamber races so that the adjustment of the volume of the working chamber can be carried it down to zero.

A displaceable part bearing the race of the working chamber is located in the stator in each case between the separating parts. This displaceable part may be slided over the side walls of the partition chamber and the stator. This, advantageously, offers an infinitely variable displacement or adjustment or the working chambers and/or their size, with the displaceable part being subjected to a perfect guidance within the stator. The guide surfaces are provided with profile guides in the direction of displacement. As a result, operationally safe movability is assured. The member causing the lifting of the part may be designed as a curved body with radial or axial sliding track and/or as sliding groove. This makes possible in a simple manner an infinitely variable adjustment of the size of the working chamber. The member is of multi-piece design and may be propellable simultaneously individually and/or in pairs. Thus all working chambers of the rotary piston engine can be adjusted advantageously either together or individually as required with regard to their volume.

A mobile intermediate part adjusted to both these parts is arranged between the displaceable part and the curve member. This intermediate part, advantageously, ensures an adjustability which is very easy to execute.

Several working chambers may be connected in groups, in series and/or juxtaposed. Thus, various variations of the rotary piston engines can be executed advantageously, which can be oriented precisely to the application in question.

Several stators containing the working chambers may be located in a joint housing. This results in a very simple design of the rotary piston engine.

Furthermore, the feed and discharge tracks may comprise elastic material fastened to the working chamber races. A gentle handling of the piston slides is achieved thereby.

The conveying medium may be fed and discharged respectively by a core part which at the same time may serve as support of the partitions.

BRIEF DESCRIPTION OF THE DRAWINGS

FIG. 4 illustrates a sectional view of an embodiment in which the piston slides are arranged on the outside and the inside of the stator;
FIG. 4a shows a section along a line 4a—4a in FIG. 4.

FIG. 8a represents a diagonal perforation;
FIGS. 8b and 8c illustrate crosswise perforations;
and
FIG. 8d is a section along a line 8d—8d in FIG. 8c, showing the convexity or rounding-off of the tracks.

DESCRIPTION OF THE PREFERRED EMBODIMENTS

Figure 1:
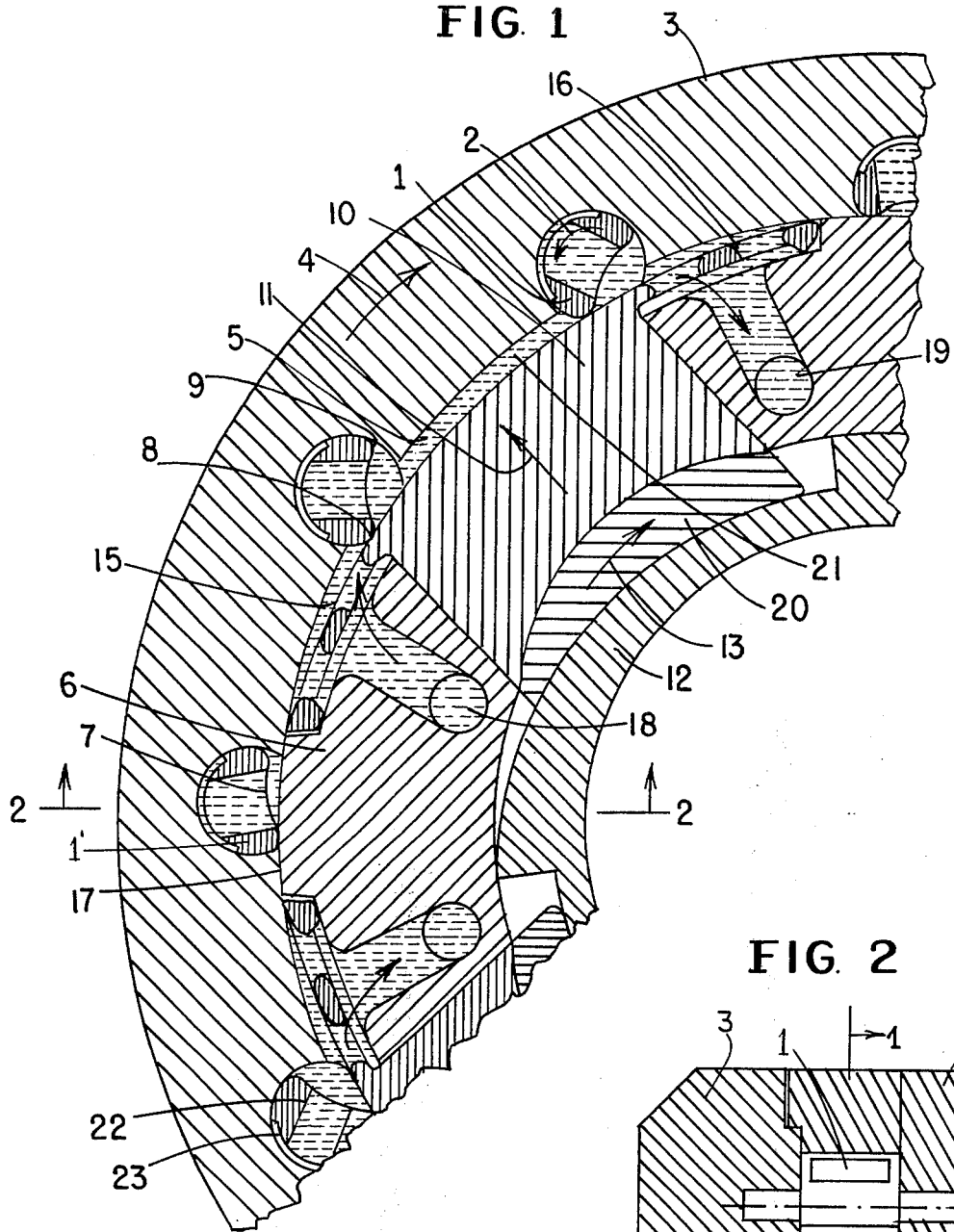
FIG. 1 represents a sectional view, partly fragmented, of the rotary piston engine according to the invention.

Referring to FIG. 1, the rotary piston engine comprises radially arranged, axis parallel piston slides 1 in the rotary piston designed as a rotor 3. The piston slides 1 may move, in accordance with the direction of rotation of the rotor 3, in the direction of the arrow 2. For example, when the rotor 3 moves in the direction of the arrow 4, the piston slides 1 move within their bearing means, likewise clockwise.

A stationary stator comprising partitions or separating parts 6 and movable or displaceable parts 10 is arranged within the rotating rotor. The displaceable parts 10 are arranged within the stator such that they are radially displaceable. The operating or working chambers 5 are located between the inner circumference of the rotor 3 and the outer surface of the movable part 10. The operating chambers 5 are connected via discharge tracks 16 and feed tracks 15, located in the separating parts 6, with the outer circumference 17 of the stator. The course of the curves thereof is advantageously continuous. Feed openings 18 and discharge openings 19 are arranged in the area of the feed tracks 15 and the discharge tracks 16. These openings are located in the separating parts 6. They penetrate the tracks 15 and 16. In order that, nevertheless, a perfect course of the curves is assured, these tracks 15 and 16 are broken diagonally or crosswise (more clearly seen in FIGS. 8a—8d), so that the piston slides can slide perfectly with their races 7 over the races of the stationary stator or the movable part 10 respectively, so that these races undergo no wear.

The movable part 10 which can be moved, for example, by cooperation of a rotatable curve part 13 and an intermediate part 20, radially outwardly or inwardly, i.e., in the direction of arrow 11 or in opposite direction, is arranged between two separating parts 6. As a result of such move, the volume of the working chamber 5 is modified. To assure a perfect motion, the displaceable part 10 may be guided not only laterally in the separating parts 6, but other profile guides may be provided bo assure perfect sliding.

Another arrangement for enabling radial motion of part 10 may be obtained by the use of parallel wedges. In displacing the wedges in a parallel manner, the part 10 is moved radially and the working chamber is adjusted as desired.

Each piston slide 1 is provided at the end of its working surface 7 with roundings 8 or 9. As a result there is produced, advantageously, for the race 7 and the remaining free portion within the bearing an unequal sided triangle. If a piston slide 1 has scanned the feed opening 15 and continued its movement a little further, the medium 21 located within the working chamber will press against the working surface 7 of the piston slide, thus pressing it firmly against the race of the working chamber. This assures a perfect sealing. A radial sliding track is indicated in FIG. 1 as the line between the cam ring 12 and the intermediate part 20.

As shown in FIG. 1, the working surface 7 of the piston slide 1, on the left side of the drawing, may be provided with a perforation 22 connected on the opposite surface to a recess 23. This, advantageously, maintains the friction of the piston slide 1 low within its bearing means and good pressure equilibrium is obtained.

Figure 2:
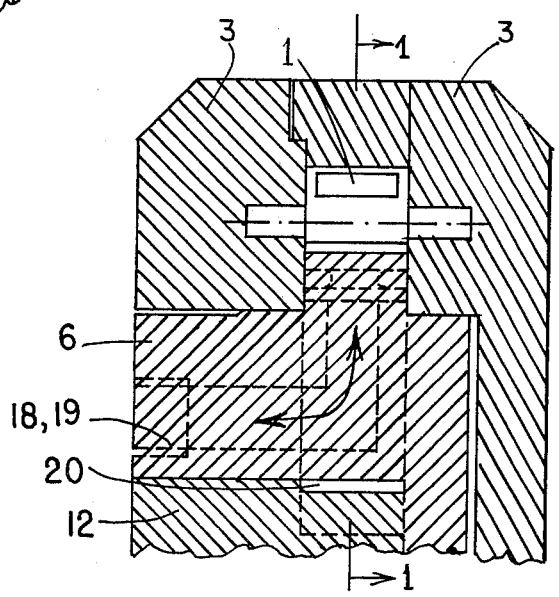
FIG. 2 shows a section along 2—2 in FIG. 1, illustrating structural details of the stator and the piston slides.

FIG. 2, which is a sectional view of FIG. 1 illustrates the structural and functional relationships between the rotor 3, the stator 6 and the piston slides 1.

Figure 3:
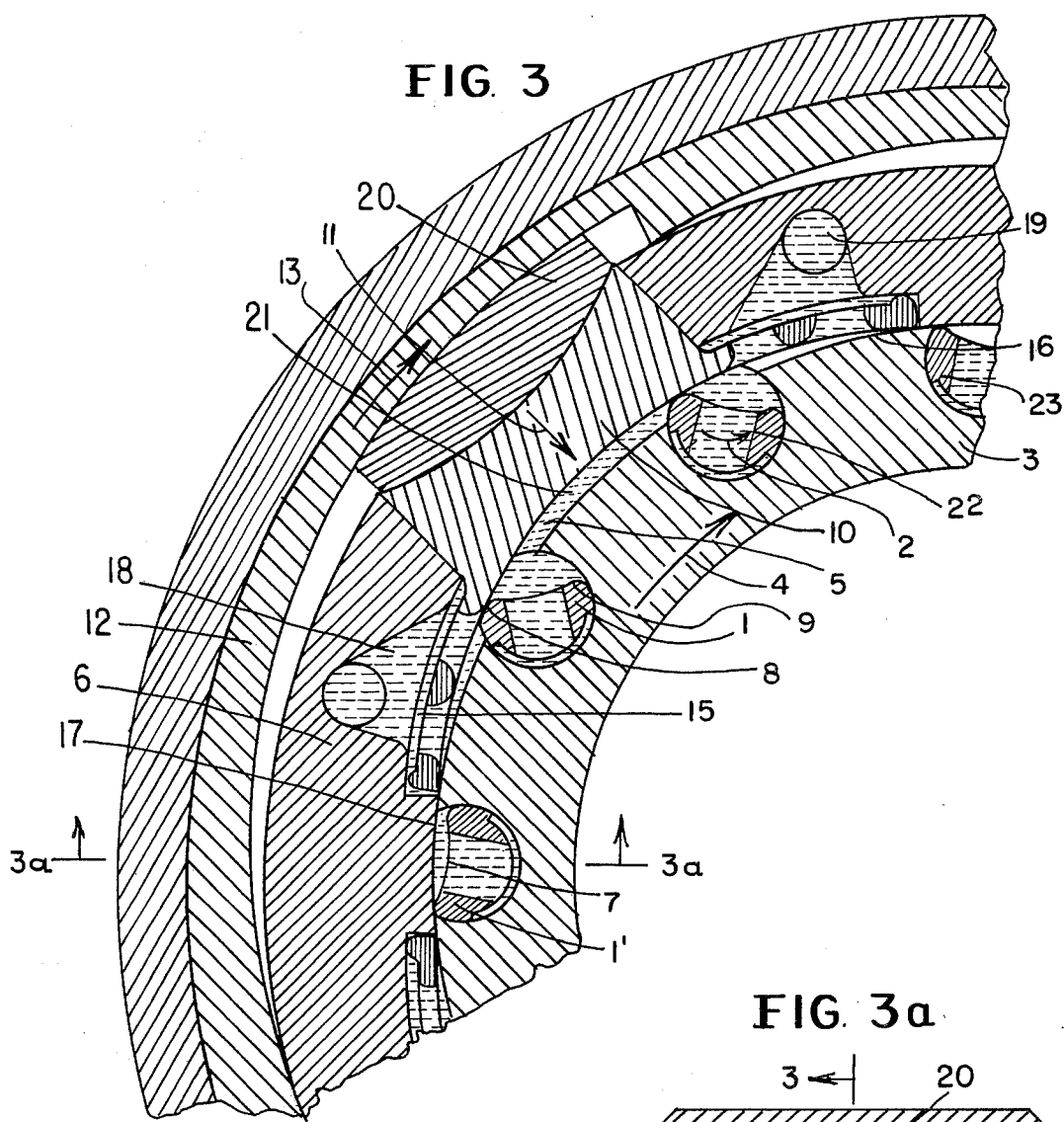
FIG. 3 is a sectional view of another embodiment in which the rotor is positioned within the stator.

In the embodiment in FIG. 3, the rotor 3 is positioned within the stator 6. Adjustment of the working chamber 5 is done as in the preceding embodiment by means of the curved part 12, the intermediate part 20 and the movable part 10.

Figure 3A:
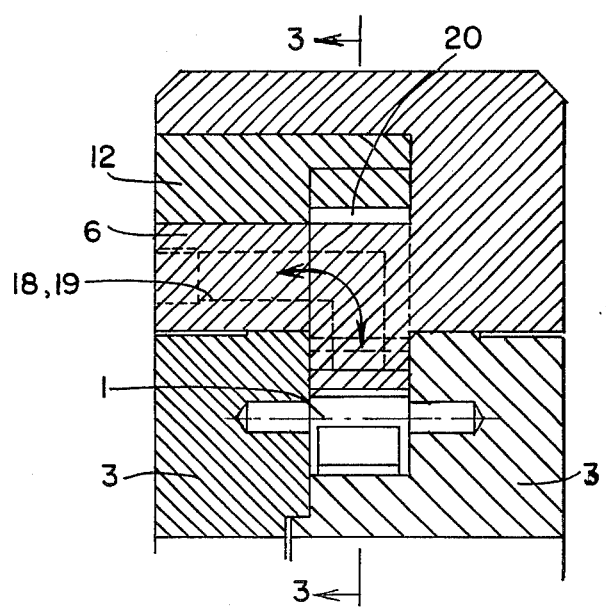
FIG. 3a illustrates a section along a line 3a—3a in FIG. 3.

The structural relationship between the elements is indicated in the sectional view of FIG. 3a.

The embodiment of FIG. 4 shows the piston slide 1 both inside and outside of the stator, while the movable part 10 is arranged on the inside thereof. The assembly comprises inner and outer working chambers 5. However, as a result of the position of the adjusting elements, only the inner working chambers are capable of being adjusted.

The sectional view in FIG. 4a shows the structural relationship between the stator, rotor and piston slides 1 on both sides of the stator 6.

Figure 5A:
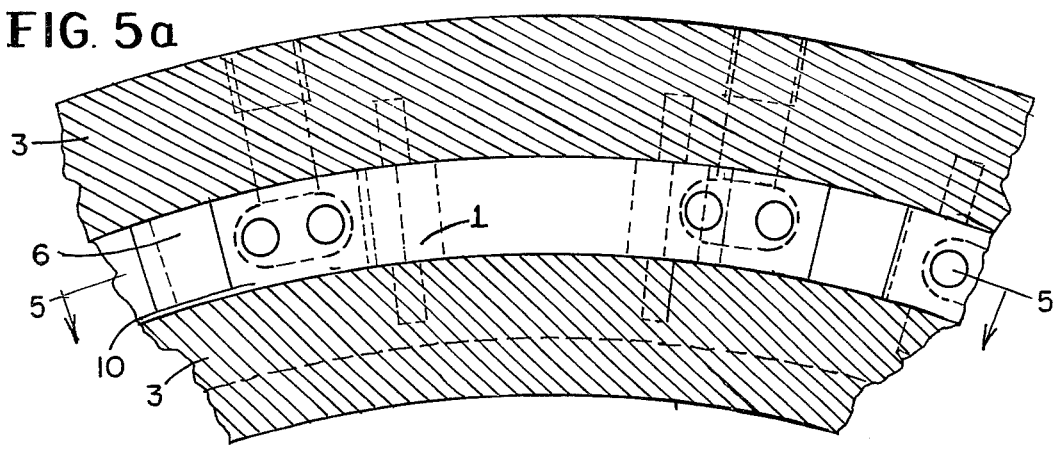
FIGS. 5a and 5b show sections along lines 5a—5a and 5b—5b of FIG. 5.
Figure 5:
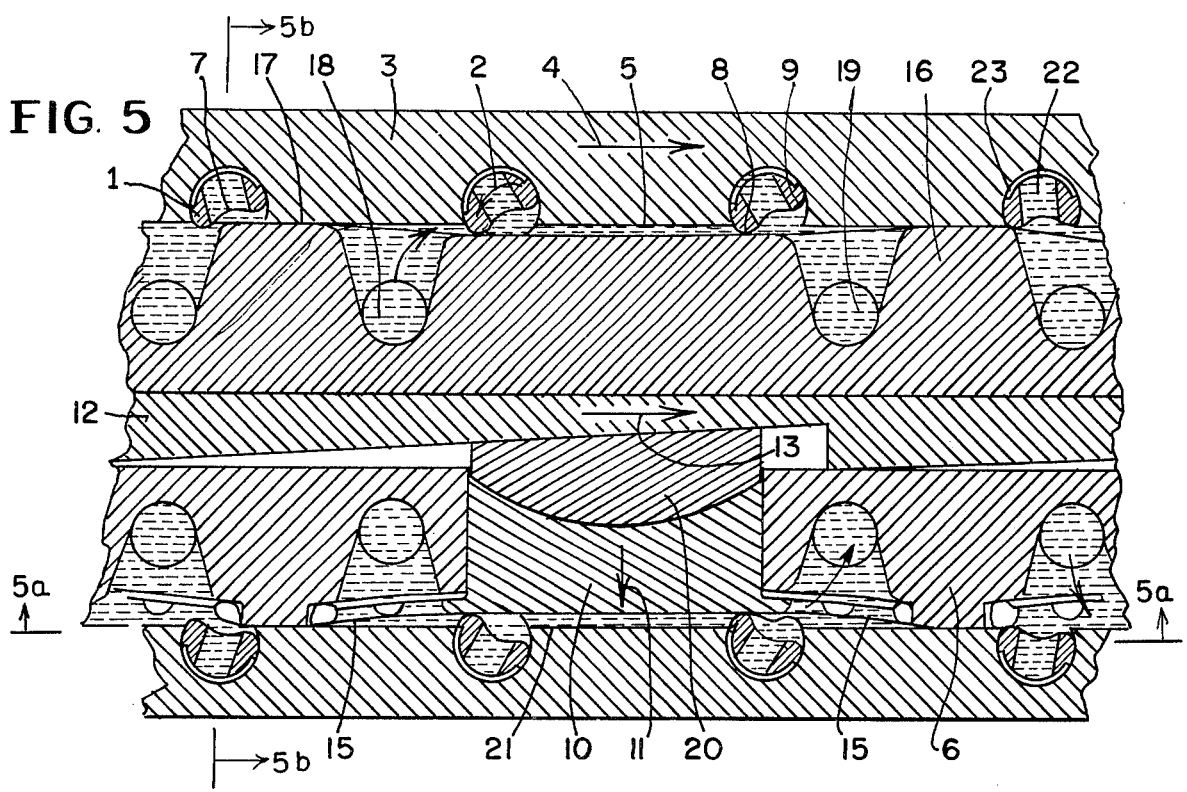
FIG. 5 illustrates a sectional view of an embodiment in which the piston slides are arranged to move along a disc.
Figure 5B:
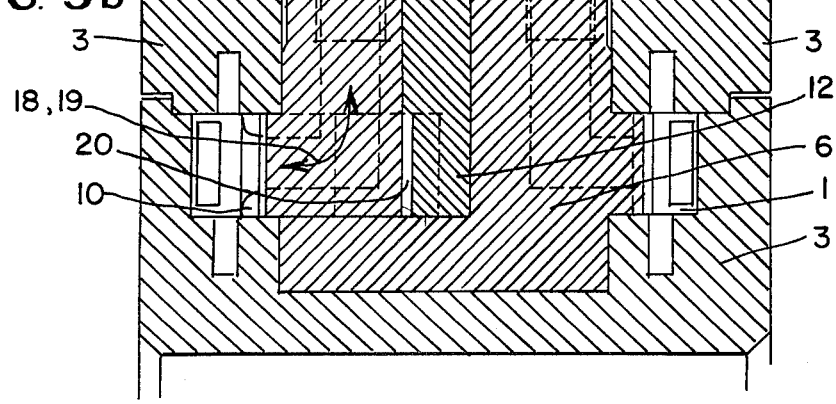

FIGS. 5, 5a and 5b illustrate an embodiment in which the piston slides are constructed to move along a disc. The piston slides 1 are arranged in both sides of the disc.

As best seen in FIG. 5, there are working chambers on both sides of the disc. However, only on one side of the disc, i.e., the lower side in the drawing of FIG. 5, the working chambers can be adjusted as by the movable part 10, the intermediate part 20 and the curved body 12.

The other side of the disc, the upper side in the drawing, has no such elements and the working chamber is not adjustable.

The embodiment may certainly be modified such that the working chambers on both sides of the disc are either adjustable or not adjustable.

Figure 6A:
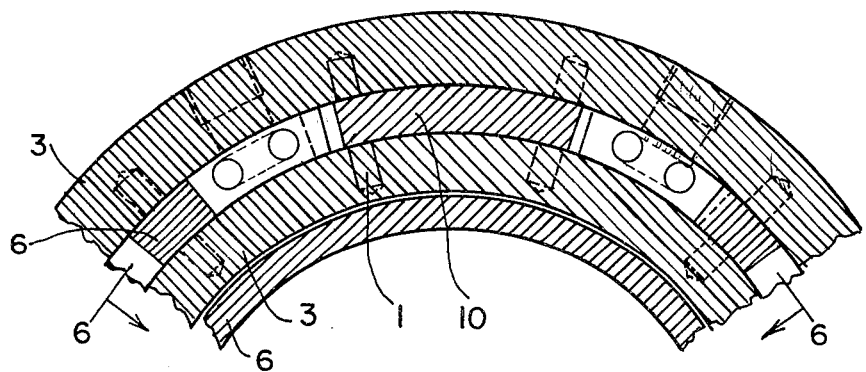
FIGS. 6a and 6b show sections along lines 6a—6a of FIG. 6b and 6b—6b of FIG. 6, respectively.
Figure 6:
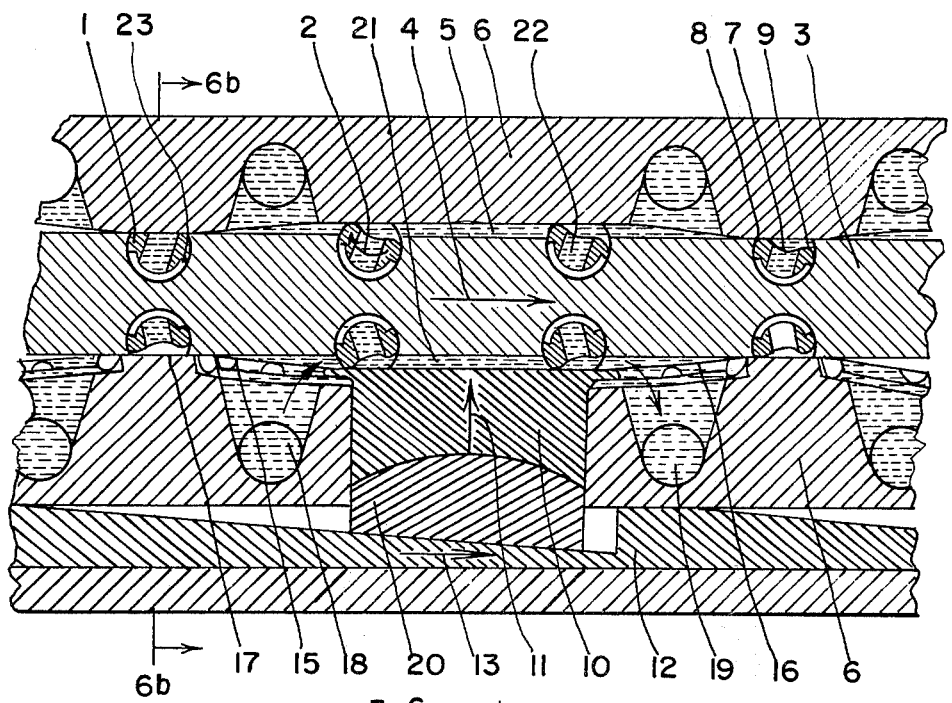
FIG. 6 illustrates an embodiment in which the rotor is arranged within a disc.
Figure 6B:
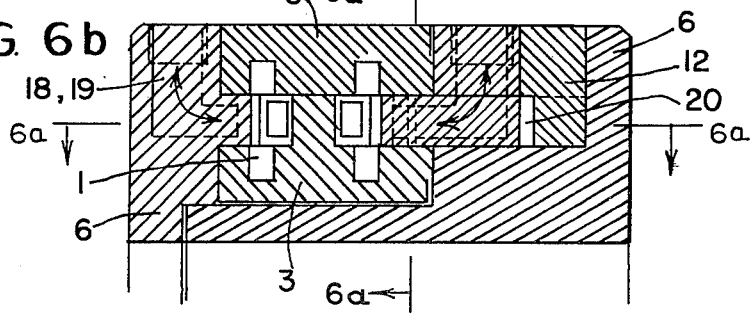

FIGS. 6, 6a and 6b show an embodiment in which the rotor 3 rotates within a disc.

The piston slides 1 are arranged in pairs disposed side by side. Here, again, the one side is shown provided with elements for adjusting the working chamber. But, as in the preceding embodiment, it is readily possible to provide both sides or no side with such adjusting elements.

Figure 7A:
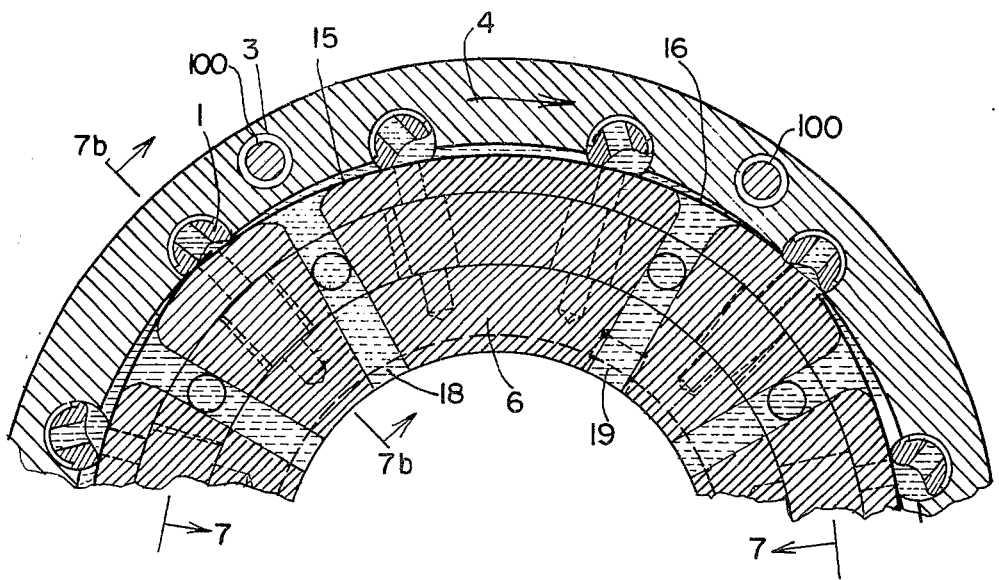
FIGS. 7a and 7b show sections along lines 7a—7a of FIG. 7b and 7b—7b of FIG. 7a, respectively.
Figure 7:
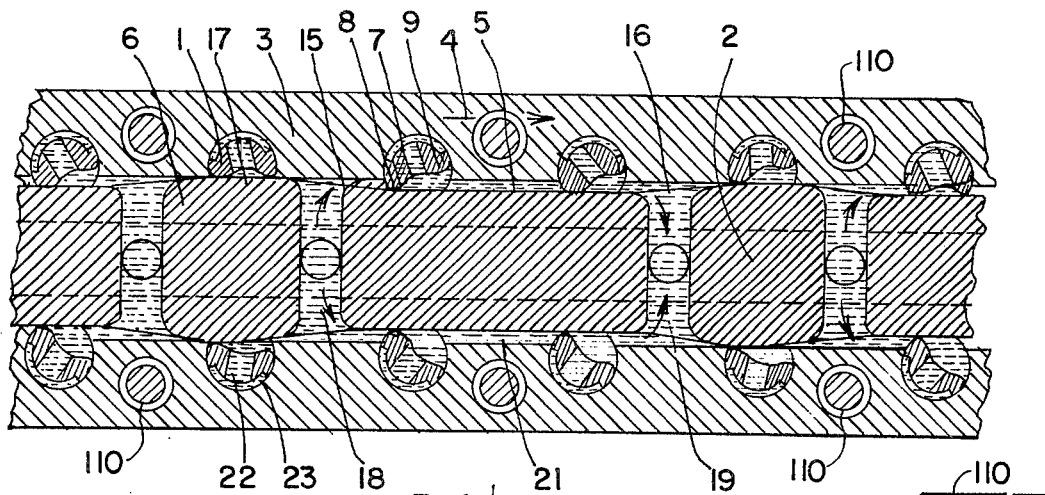
FIG. 7 illustrates an embodiment with a stator having a cross section of a "T" configuration.
Figure 7B:
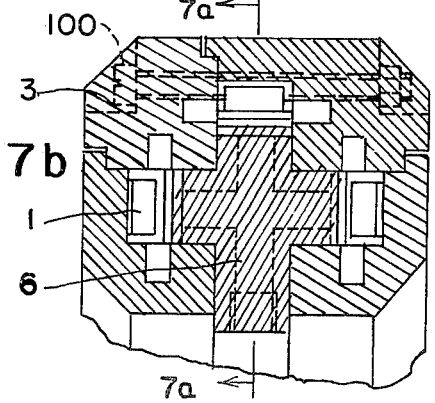
Figure 7C:
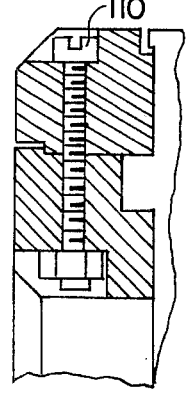
FIG. 7c shows a structural detail on fastening the rotor.
Figure 8A:
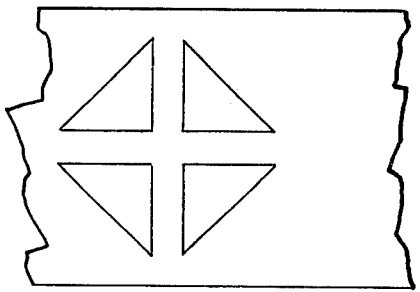
FIGS. 8a to 8d illustrate track structures in plan and section views.
Figure 8B:
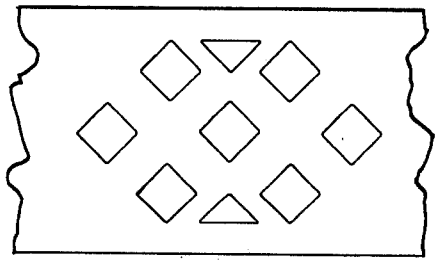
Figure 8C:
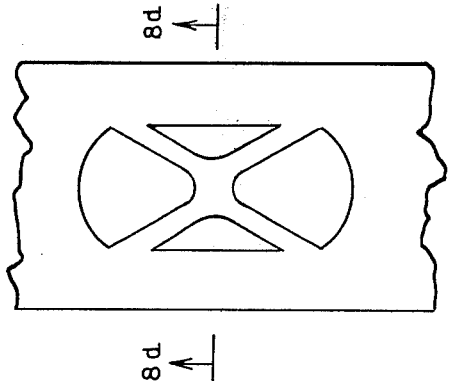
Figure 8D:

FIGS. 7, 7a and 7b illustrate an embodiment in which the stator 6 has a "T" configuration as best seen in FIG. 7b.

The stator is surrounded by the rotor 3 which comprises four parts, parallel pairs of piston slides 1, and a transversely arranged row of piston slides 1. The parts are fastened by lateral screws 100 and radial screws 110.

In operation, it is to be noted that, generally, the rotary piston engine may operate as a pump or as a motor.

The rotary piston engine is a pure displacement engine. The medium is not compressed within the engine. As best seen in FIG. 1, the medium enters into the machine, e.g. through the port 18 and is then moved by the following piston member 1' in clockwise direction between the preceding piston 1 via the operating chamber 21 to the outlet 19. The engine now operates as a pump and pushes a medium from the tube 18 into the passage 19 by the cooperation of the piston slides 1 positioned in the rotor 3.

On the other hand if the engine is to operate as a motor, the medium is pressed into the passage 19 which now engages the next piston 1 and pushes it on until it is again discharged through the port 18. In this case, the rotor 3 is rotated counterclockwise.

If the displacement engine operates so as to act as a pump, i.e., with a throttle valve disposed in the passage 19, the pressure may thereby be increased and a compression takes place outside the engine.

If in the case of operation as a pump a lower or higher volume is to be moved, the volume of the operating chamber 5 will have to be changed.

This is done by moving the movable part 10 in radial direction as described earlier. The tracks 15 and 16 which are made e.g. from plastic adapt themselves to the changed operating volume so that a uniform curve track results.

Further considering the operation as a pump, the following details are to be noted.

At first the piston slide 1' adheres with its operating surface 7 flatly on the outer periphery of the separating part 6. As the movement of the rotor 3 continues, the piston slide 1' scans the race 15 and is thereby subjected to a slight counterclockwise rotation with the aid of an adjustable spring, not shown, or of some other mechanical or hydraulic elements. This produces in the following position a suction effect relative to the feed opening 18, whereby a medium is aspirated. This suction is reinforced by the piston slide placed thereahead, as the sealing is not yet fully effective. Only as the movement continues, will the medium located within the working chamber 5 be so urged against the piston slide that a very slight counterclockwise movement is caused, whereby the spring is relieved and at the same time a safe sealing is assured. As the movement continues, the piston slide aspirates the medium from the discharge aperture with its rear side. With continued rotation of the rotor 3 the medium placed within the operating chamber is urged into the discharge opening 19, located within the range of the discharge track 16. This brings about in a simple manner a perfect conveyance of the medium, so that the rotary piston engine operating as a pump, has a very high degree of effectiveness, achieves a high delivery output and yet is of simple design.

Furthermore, as previously indicated, it is possible, without any constructive change, to operate the rotary piston engine as a motor. All that is required is to reverse the direction of the rotor, i.e., clockwise, whereby the discharge opening 19 is placed under pressure, so that by way of the discharge opening, the working surface of the piston is impinged by the medium and caused to further rotate. The rotation continues until the piston slide scans the opening now used as discharge opening 18, whereby this movement is concluded. Again, with the aid of the roundings 8 and 9 a perfect sealing is accomplished in the area of the working chambers, so that here again the springs which ply to the piston slides a slight torque are loaded only a short time.

The races at the outer circumference of the stator may be made of elastic material so that good operating properties are obtained relative to the piston slide.

The rotary piston engine, according to the invention, can be used, for example, for the transmission of high torques in shipbuilding, in gear construction, as a torque converter, as braking device, for the propulsion of steamrollers, chain vehicles, crane installations with simultaneous generation of necessary conveying current to drive rotary and pivoting devices. The rotary piston engine, also may be used in automobile construction, for example, as a pump coupled to the engine of a self-propelled vehicle or as a motor with two, four or all wheel drive. This advantageously eliminates the gear, differential, differential block and cardan shaft, since the engine, according to the invention, can perform all functions of these devices.

The invention is also applicable in aircraft construction, for example, as a steering element drive, for the transmission of power without rigid shafts in compressors, loaders, propellers, helicopters, auxiliary rotors and the like, and further, for driving or braking stem or turn wheels, and as a pressure medium generator for hydraulically operated parts.

Moreover, the invention may be applied in the construction of hydro turbines. Here, for example, several turbines may operate on one generator.

Another important feature of the invention is the turning and shifting of the curved part 12 and the movable part 10 in an almost loadless phase of the rotation of the piston hub.

According to the invention, this condition is achieved by so synchronizing the number of rotary pistons located at the circumference of the piston hub with the length of the working chamber in rotating direction that several pistons simultaneously scan the races of the working chambers to be adjusted, wherein the piston slides 1 seal the working chambers at least toward one side, so that for the moment of the scanning of these points there is a loadless condition without the pressure declining in the pressure range of the engine. This moment lasting only a short time is used for a whole or partial displacement of the working chambers.

It is also advantageous to arrange blocking parts (not shown) between or behind the curve elements 12 causing the shifting of part 10 to prevent any unintentional setting of the curved elements.

I claim:

1. A rotary piston engine comprising:
   A. a symmetrical rotor including bearing means;
   B. a plurality of oscillating piston slides supported in said bearing means, each of said slides having a semilunar cross section and comprising a notch including a working surface on one side thereof and a rearward recess in communication with said working surface via a duct;
   C. a symmetrical stator, arranged concentrically with said rotor, having inner, outer and lateral surfaces, including,
   a. successive separating parts spaced around said stator and cooperating with said rotor and said slides, a portion of each separating part abutting said rotor,
   b. feed ports and discharge ports between each of said portions communicating with a conveying medium,
   c. a working chamber defined between each of said portions and said rotor, and
   d. perforated coverings over said feed and discharge ports between said ports and said rotor, connecting said feed and discharge ports to said working chambers and said piston slide ducts.

2. The engine as set forth in claim 1 in which the rotor and stator are disposed in the engine such that the rotor is on the outside of the stator and the working chambers are at the outer circumference of the stator.

3. The engine as set forth in claim 1 in which the rotor and stator are disposed in the engine such that the rotor is on the inside of the stator, and the working chambers are arranged at the inner circumference of the stator.

4. The engine as set forth in claim 1 in which the inner and outer circumferences of the stator include working chambers with which piston hubs comprising piston slides are associated on the inside and outside.

5. The engine as set forth in claim 1 in which the stator compriss a central web, the working chambers being disposed on at least one lateral surface of the web.

6. The engine as set forth in claim 1, in which the stator has a configuration of a disc having a groove at the frontal surface thereof, the working chambers being disposed at the lateral surfaces of the groove.

7. The engine as set forth in claim 1 in which the stator has a configuration of a "T" profile, the working chambers being disposed on the profile surfaces, wherein the rotor comprises four parts which are fastened to one another by screws.

8. The engine as set forth in claim 1 including means for reversing the direction of rotation of the rotor during standstill and rotation, said reversing means including a pressure medium arranged to emerge from at least one of the discharge ports and to move the piston slides along the working chamber counterclockwise, until the pressure medium leaves the engine through at least one of said feed ports.

9. The engine as set forth in claim 1 in which the notch of the piston slide extends in the axial direction thereof, the depth of the notch corresponding to the height of the working chamber, and the length of the notch corresponding to the width of the working chamber.

10. The engine as set forth in claim 1 in which each perforated covering includes a radial sliding track.

11. The engine as set forth in claim 1, in which the surface of the stator having the working chambers is structured to form the running surface for the piston slides.

12. The engine as set forth in claim 1, in which the feed and discharge ports are positioned in the separating parts close to the ends thereof.

13. The engine as set forth in claim 1, in which the feed and discharge perforated coverings comprise tracks which are of ball-shaped configuration.

14. The engine as set forth in claim 13, in which the tracks are perforated in a diagonal direction.

15. The engine as set forth in claim 13 in which the tracks are crosswise perforated.

16. The rotary piston engine as set forth in claim 1 further comprising:
   radial movable means between said separating parts for changing the volume of at least one of said working chambers.

17. The rotary piston engine as set forth in claim 16, in which the radial movable means comprises movable parts, and means for radially moving said movable parts, said last means including a rotating cam ring having a plurality of cam elements including curve portions with increasing diameters and circumferentially spaced, and intermediate parts placed between the cam elements and the movable parts so as to transmit the displacements caused by the movements of the cam formations to the movable parts.

18. The engine as set forth in claim 16 in which the numbers of working chambers and piston slides are coordinated such that while one piston slide seals a working chamber, another piston slide is in the preceding feedrange, the radial movable means having the least load in this position.

* * * * *